United States Patent
Lee et al.

(10) Patent No.: US 9,401,792 B2
(45) Date of Patent: Jul. 26, 2016

(54) METHOD AND DEVICE FOR RECEIVING OR TRANSMITTING DOWNLINK CONTROL SIGNAL IN WIRELESS COMMUNICATION SYSTEM

(71) Applicant: LG ELECTRONICS INC., Seoul (KR)

(72) Inventors: Jihyun Lee, Anyang-si (KR); Inkwon Seo, Anyang-si (KR); Hanbyul Seo, Anyang-si (KR); Seungmin Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/349,605

(22) PCT Filed: Sep. 23, 2013

(86) PCT No.: PCT/KR2013/008477
§ 371 (c)(1),
(2) Date: Apr. 3, 2014

(87) PCT Pub. No.: WO2014/046497
PCT Pub. Date: Mar. 27, 2014

(65) Prior Publication Data
US 2014/0269595 A1    Sep. 18, 2014

Related U.S. Application Data

(60) Provisional application No. 61/703,792, filed on Sep. 21, 2012, provisional application No. 61/721,517, filed on Nov. 2, 2012, provisional application No. 61/723,754, filed on Nov. 7, 2012.

(51) Int. Cl.
*H04L 5/00* (2006.01)
*H04W 48/16* (2009.01)

(52) U.S. Cl.
CPC ............. *H04L 5/0053* (2013.01); *H04W 48/16* (2013.01); *H04L 5/001* (2013.01); *H04L 5/0037* (2013.01)

(58) Field of Classification Search
CPC ............................ H04L 5/0053; H04W 24/00
USPC .......................................... 370/311, 329, 330
See application file for complete search history.

(56) References Cited

U.S. PATENT DOCUMENTS

2011/0070845 A1*  3/2011  Chen et al. ...................... 455/91
2011/0105162 A1*  5/2011  Kim et al. ...................... 455/500

(Continued)

FOREIGN PATENT DOCUMENTS

WO   WO 2012/109542 A1   8/2012
WO   WO 2013/025677 A2   2/2013

OTHER PUBLICATIONS

Motorola Mobility, "CCE Design for EPDCCH", Discussion/Decision. 3GPP TSG RAN WG1 #59, May 21-25, 2012, Prague, Czech Republic, R1-122662, pp. 1-4.

(Continued)

*Primary Examiner* — Brian D Nguyen
*Assistant Examiner* — Toan Nguyen
(74) *Attorney, Agent, or Firm* — Birch, Stewart, Kolasch & Birch, LLP

(57) ABSTRACT

A method and apparatus for receiving and transmitting downlink control information in a wireless communication system are disclosed. The method for receiving a downlink control signal by a user equipment (UE) in a wireless communication system includes: receiving an Enhanced Physical Downlink Control Channel (EPDCCH) from a downlink serving base station (BS); and monitoring a plurality of EPDCCH candidates in an EPDCCH set contained in the received EPDCCH, wherein a minimum aggregation level (AL) of the EPDCCH candidates is associated with a downlink (DL) bandwidth of the wireless communication system and downlink control information (DCI) format.

15 Claims, 12 Drawing Sheets

(56) References Cited

U.S. PATENT DOCUMENTS

| | | | |
|---|---|---|---|
| 2011/0310817 A1* | 12/2011 | Okubo et al. | 370/329 |
| 2012/0054258 A1 | 3/2012 | Li et al. | |
| 2012/0157143 A1* | 6/2012 | Tsunekawa et al. | 455/509 |
| 2012/0236813 A1* | 9/2012 | Tan | 370/329 |
| 2013/0044664 A1* | 2/2013 | Nory et al. | 370/311 |
| 2013/0044727 A1* | 2/2013 | Nory et al. | 370/330 |
| 2013/0242890 A1* | 9/2013 | He et al. | 370/329 |

OTHER PUBLICATIONS

Research in Motion, UK Limited, "Considerations on E-PDCCH Search Space Design", Discussion, 3GPP TSG RAN WG1 Meeting #70, Qingdao, P.R. China, Aug. 13-17, 2012, pp. 1-5.

Samsung, "ePDCCH Design and RE Mapping", Discussion and Decision, 3GPP TSG RAN WG1 #70, Qingdao. China, Aug. 13-17, 2012, R1-123482, pp. 1-9.

3GPP, "3rd Generation Partnership Project; Technical Specification Group Radio Access Network; Evolved Universal Terrestrial Radio Access (E-UTRA); Physical layer procedures (Release 11)," 3GPP TS 36.213 V11.0.0, Sep. 2012, 1-143 pgs.

ASUSTeK, "Localized and Distributed ePDCCH USS Candidates in Same Subframe," 3GPP TSG RAN WG1 Meeting #70, R1-123714, Qingdao, China, Aug. 13-17, 2012, 2 pgs.

HTC, "RE mapping for ePDCCH," 3GPP TSG-RAN WG1 #70, R1-123862, Qingdao, China, Aug. 13-17, 2012, 7 pgs.

NEC Group, "ePDCCH search space design," 3GPP TSG RAN WG1 Meeting #69, R1-122595, Prague, Czech Republic, May 21-25, 2012, 11 pgs.

Nokia et al., "Considerations on search spaces," 3GPP TSG RAN WG1 Meeting #70, R1-123653, Qingdao, China, Aug. 13-17, 2012, 8 pgs.

NTT Docomo, "Performance Evaluation of Search Space for ePDCCH," 3GPP TSG RAN WG1 Meeting #70, R1-123552, Qingdao, China, Aug. 13-17, 2012, 6 pgs.

Panasonic, "ePDCCH search space design and configuration," 3GPP TSG RAN WG1 Meeting #69, R1-122202, Prague, Czech Republic, May 21-25, 2012, 5 pgs.

Samsung, "Design Principles of E-PDCCH Search Spaces," 3GPP TSG RAN WG1 #68bis, R1-121643, Jeju, Korea, Mar. 26-30, 2012, pp. 1-3.

Texas Instruments, "Aggregation Level of ePDCCH with Localized and Distributed Transmission," 3GPP TSG RAN WG1 Meeting #69, R1-122742, Prague, Czech, May 21-25, 2012, 1-2 pgs.

ZTE, "Discussion on DMRS scrambling sequence for enhanced PDCCH," 3GPP TSG RAN WG1 Meeting #70, R1-123313, Qingdao, China, Aug. 13-17, 2012, 1-5 pgs.

* cited by examiner

METHOD AND DEVICE FOR RECEIVING OR TRANSMITTING DOWNLINK CONTROL SIGNAL IN WIRELESS COMMUNICATION SYSTEM

This application is the National Phase of PCT/KR2013/008477 filed on Sep. 23, 2013, which claims priority under 35 U.S.C. 119(e) to U.S. Provisional Application No. 61/703,792 filed on Sep. 21, 2012, 61/721,517 filed on Nov. 2, 2012 and 61/723,754 filed on Nov. 7, 2012, all which are hereby expressly by reference into the present application.

TECHNICAL FIELD

The present invention relates to a wireless communication system, and more particularly to a method and apparatus for receiving and transmitting downlink control signal in the wireless communication system.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for receiving and transmitting downlink control signal in the wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The objects of the present invention can be achieved by providing a method for receiving a downlink control signal by a user equipment (UE) in a wireless communication system including: receiving an Enhanced Physical Downlink Control Channel (EPDCCH) from a downlink serving base station (BS); and monitoring a plurality of EPDCCH candidates in an EPDCCH set contained in the received EPDCCH, wherein a minimum aggregation level of the EPDCCH candidates is associated with a downlink (DL) bandwidth of the wireless communication system and downlink control information (DCI) format.

Preferably, if the downlink (DL) bandwidth is comprised of at least 25 resource blocks (RBs) and the DCI format is one of DCI formats 2, 2A, 2B, 2C and 2D, the minimum aggregation level may be 2.

Preferably, if the number of PRB pairs constituting the EPDCCH set is 4, 8, 4, 2, and 1 EPDCCH candidate(s) may be set to aggregation levels 2, 4, 8, and 16, respectively.

Preferably, the method may further include: receiving information regarding the number of EPDCCH candidates for each aggregation level (L) from the downlink serving BS.

Preferably, if an aggregation level (hereinafter, "L1") is set to be higher than the number of enhanced control channel elements (ECCEs) contained in the EPDCCH set, the method may further includes allocating EPDCCH candidates for the L1 to other aggregation levels.

Preferably, the EPDCCH candidates for the L1 may be attempt to be allocated to the other aggregation level with priority from the highest aggregation level to the lowest aggregation level from among aggregation levels less than the L1, from among aggregation levels set in the EPDCCH set.

Preferably, if additional EPDCCH candidate cannot be allocated to a specific aggregation level from among aggregation levels less than the L1, the additional EPDCCH candidate may be allocated to a next highest aggregation level subsequent to the specific aggregation level.

Preferably, the number of EPDCCH candidate of the EPDCH set may be decided according to each aggregation level (L), the number (N) of physical resource block (PRB) pairs of the EPDCCH set, and the number of enhanced control channel elements (ECCEs) per PRB pair, wherein the number of EPDCCH candidates for each N is fixed.

Preferably, if two EPDCCH sets are present, the two EPDCCH sets may be set to have different minimum aggregation levels.

Preferably, if two EPDCCH sets are present, the two EPDCCH sets may be set in a manner that individual aggregation levels have different numbers of EPDCCH candidates.

Preferably, if an aggregation level (hereinafter, "L2") higher than the number of enhanced control channel elements (ECCEs) contained in a first EPDCCH set is set in the first EPDCCH set, EPDCCH candidate(s) for a specific aggregation level may be allocated to a second EPDCCH set.

Preferably, the EPDCCH candidates for the L2 may be attempt to be allocated to the second EPDCCH set with priority from the highest aggregation level to the lowest aggregation level from among aggregation levels less than the L2, from among aggregation levels set in the first EPDCCH set.

Preferably, if additional EPDCCH candidate cannot be allocated to a specific aggregation level from among aggregation levels less than the L2, the additional EPDCCH candidates may be allocated to a next highest aggregation level subsequent to the specific aggregation level.

In accordance with another aspect of the present invention, a user equipment (UE) configured to receive a downlink control signal in a wireless communication system includes: a radio frequency (RF) unit; and a processor configured to control the RF unit, wherein the processor receives an Enhanced Physical Downlink Control Channel (EPDCCH) from a downlink serving base station (BS), and monitors a plurality of EPDCCH candidates in an EPDCCH set contained in the received EPDCCH, wherein a minimum aggregation level of the EPDCCH candidates is associated with a downlink (DL) bandwidth of the wireless communication system and downlink control information (DCI) format.

It is to be understood that both the foregoing general description and the following detailed description of the present invention are exemplary and explanatory and are intended to provide further explanation of the invention as claimed.

Advantageous Effects

According to exemplary embodiments of the present invention, the downlink control signal can be efficiently received and transmitted in the wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
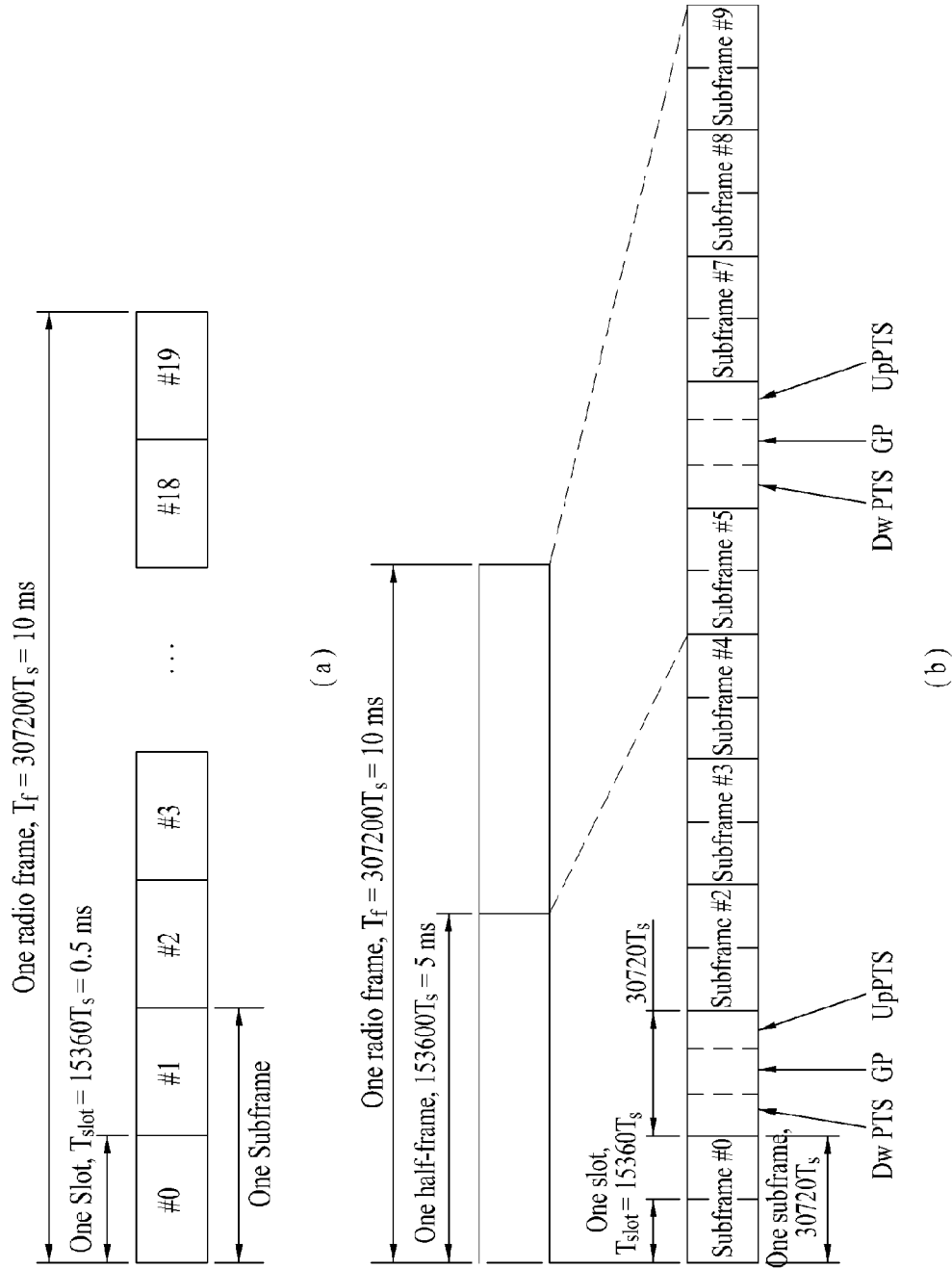
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | \multicolumn{10}{c}{Subframe number} |||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
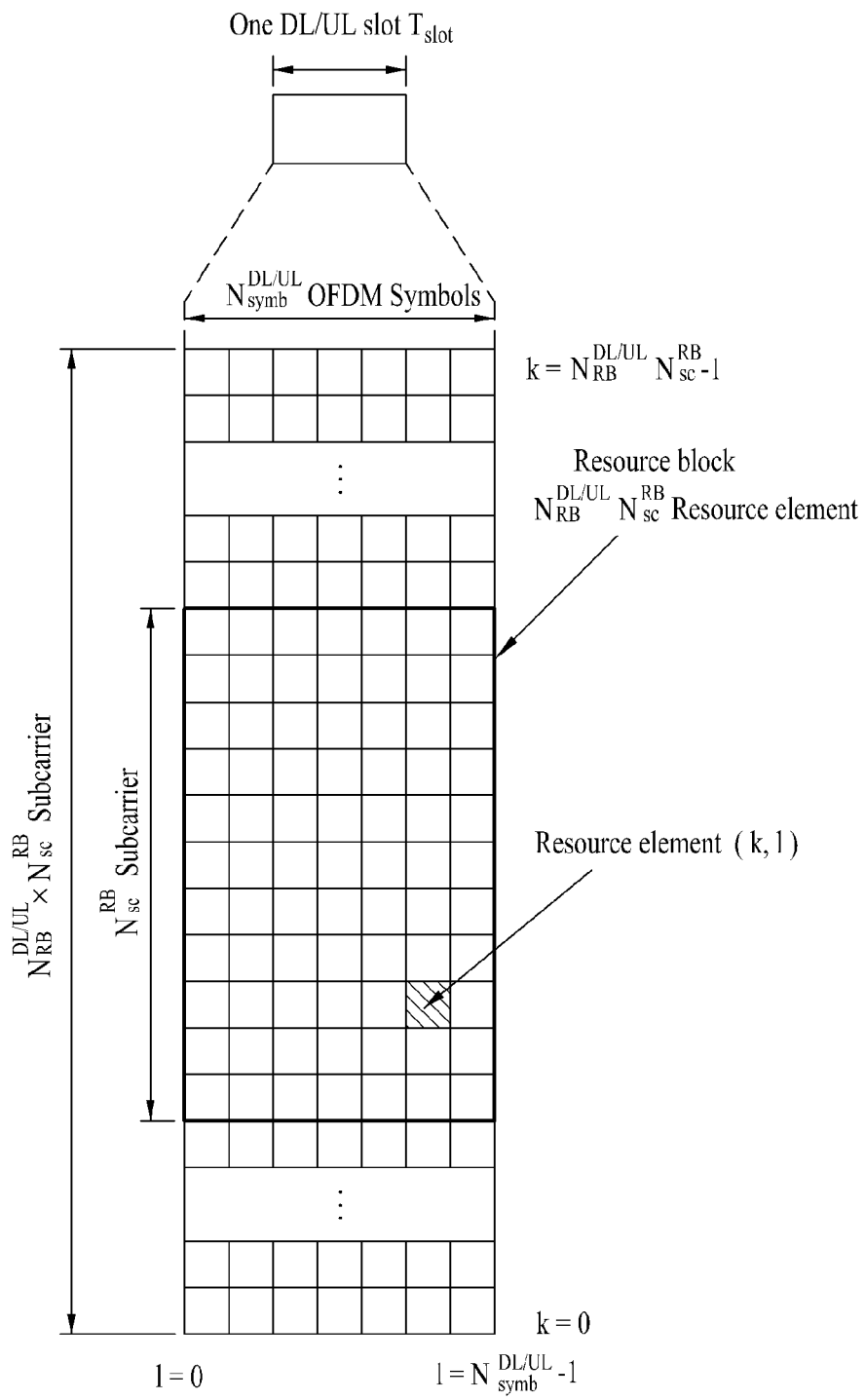
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs, which occupy $N_{sc}^{RB}$ same continuous subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDLVRB−1, and NDLVRB=NDLRB is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
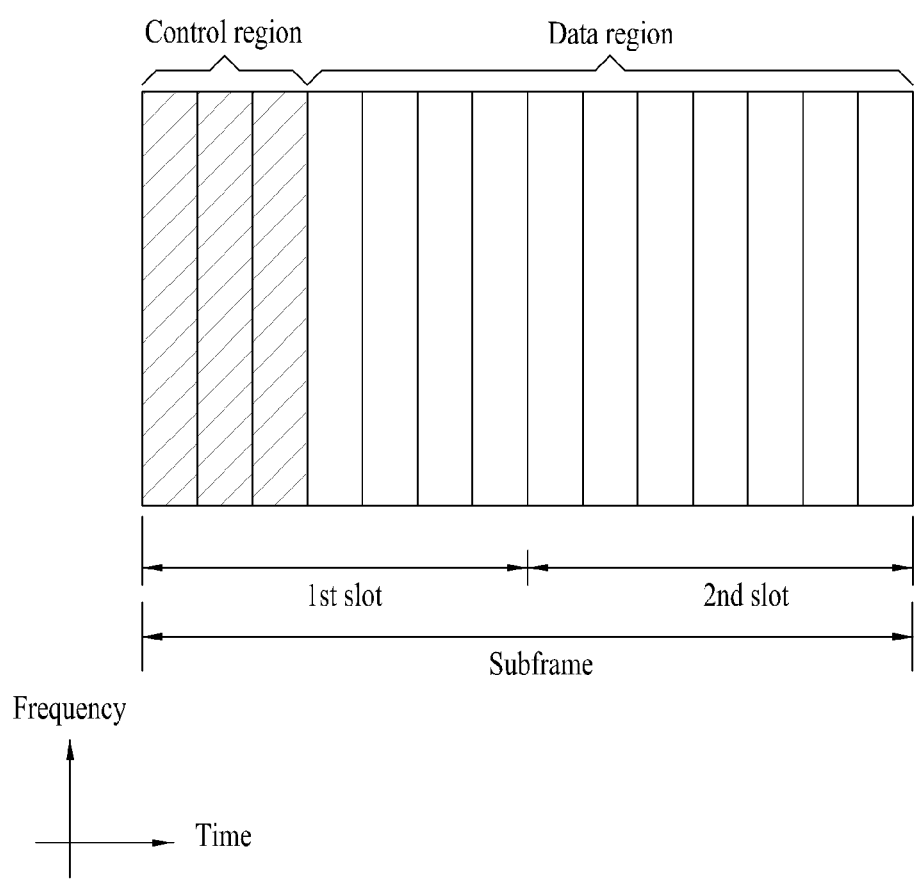
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared channel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. The aggregation levels defining the search space are indicated as follows:

TABLE 3

| Type | Aggregation Level L | Search Space Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
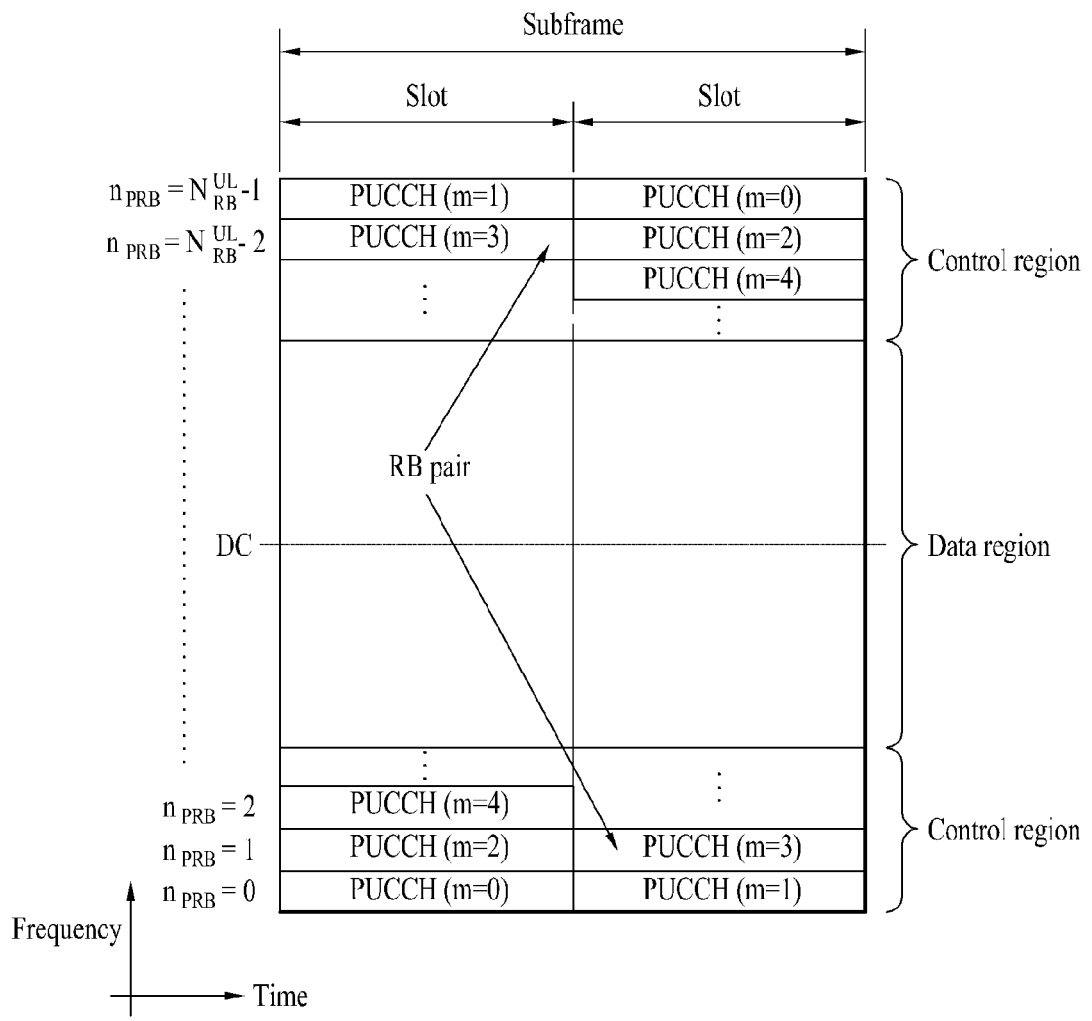
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

General EPDCCH (Enhanced PDCCH)

Owing to introduction of a multi-node system, although various communication schemes becomes available in a manner that channel quality improvement is achieved, introduction of a new control channel is being requested to apply the above-mentioned MIMO scheme and inter-cell coordinated communication scheme to the multi-node environment. Due to the above necessity, introduction of a new control channel is an Enhanced PDCCH (EPDCCH) is being intensively discussed, and the new control channel can be allocated to a data region (hereinafter referred to as a PDSCH region) instead of the legacy control region (hereinafter referred to as a PDCCH region). As a result, node control information can be transmitted per UE through EPDCCH, such that the problem of insufficiency of the legacy PDCCH region can also be solved. For reference, EPDCCH is not applied to the legacy UE, and can be received by the LTE-A UE only.

Figure 5:
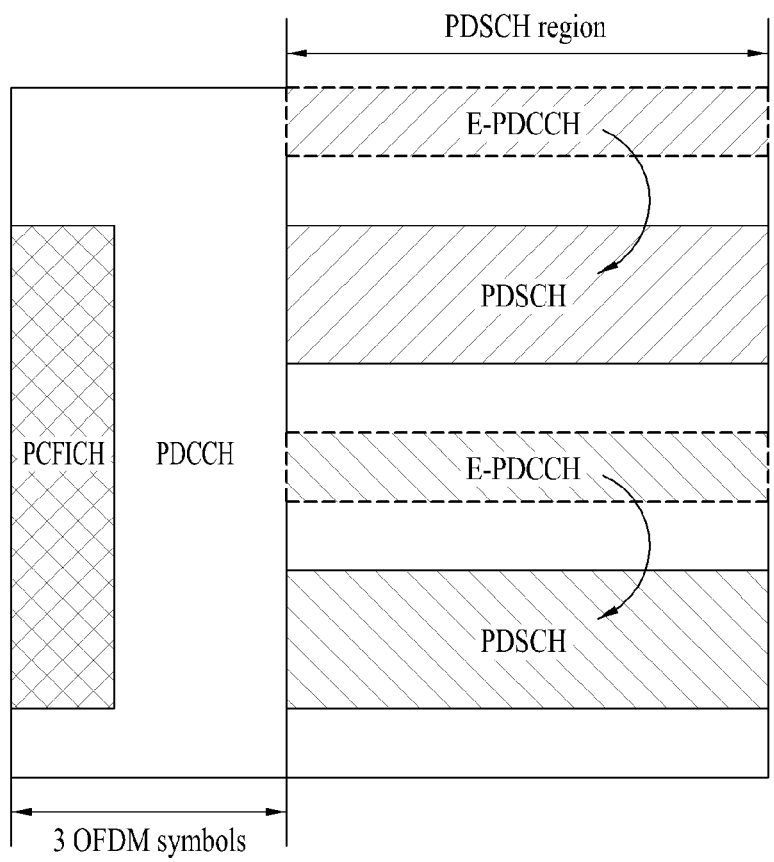
FIG. 5 exemplarily shows EPDCCH (Enhanced Physical Downlink Control Channel).

FIG. 5 is a conceptual diagram illustrating a carrier aggregation (CA) scheme.

Referring to FIG. 5, EPDCCH may define and use some parts of the PDSCH region configured to transmit data, and the UE has to perform blind decoding for detecting the presence or absence of EPDCCH. EPDCCH performs the same scheduling operation (i.e., PDSCH, PUSCH control) as in the legacy PDCCH. If the number of UEs connected to the same node as in RRH increases, many more EPDCCHs are allocated to the PDSCH region, such that the number of blind decoding times to be executed by the UE increases, resulting in increased complexity.

Meanwhile, a method for multiplexing EPDCCH for a plurality of UEs needs to be considered. In more detail, according to the multiplexing scheme proposed by the present invention, on the condition that a common resource region (i.e., a common PRB set) is configured, EPDCCHs of multiple UEs can be cross-interleaved to the frequency domain or the time domain.

Figure 6:
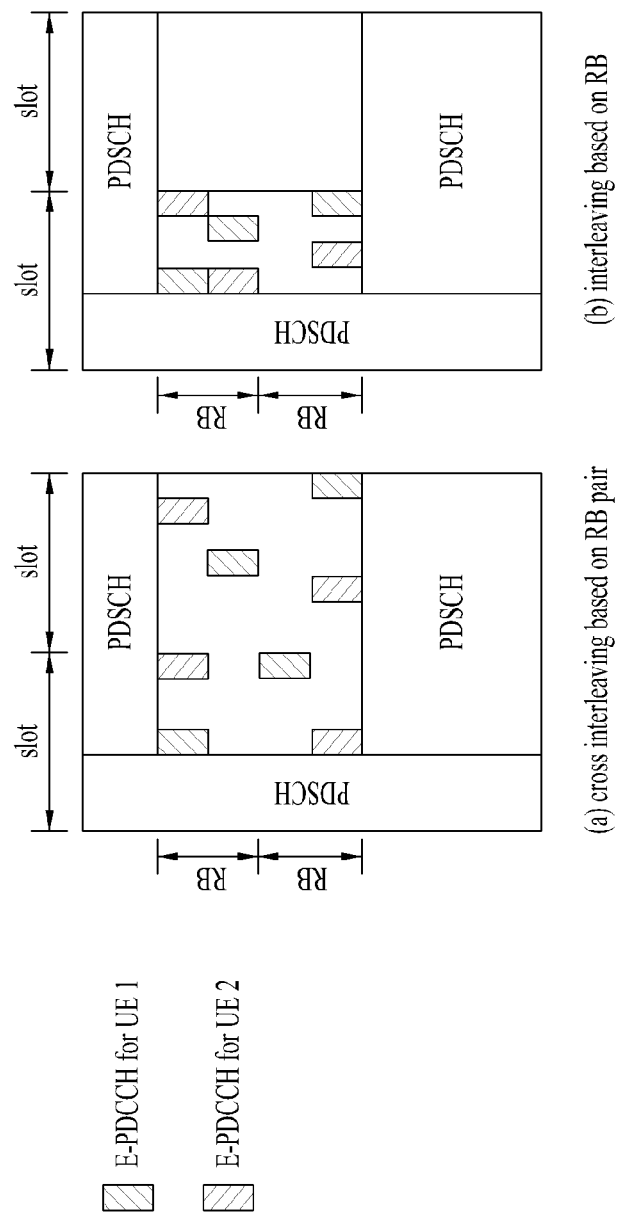
FIG. 6 exemplarily shows EPDCCH (Enhanced Physical Downlink Control Channel).

FIG. 6 is a conceptual diagram illustrating a method for multiplexing EPDCCH for a plurality of UEs.

Specifically, FIG. 6(a) shows an example in which a common PRB set is configured on the basis of a PRB pair and cross increasing is performed on the basis of the common PRB set. In contrast, FIG. 6(b) shows another example in which a common PRB set is configured on a basis of a PRB and cross interleaving is performed on the basis of the common PRB set. The schemes of FIGS. 6(a) and 6(b) have advantages in which a diversity gain of the time/frequency domains extending a plurality of RBs can be obtained.

Carrier Aggregation (CA)

Figure 7:
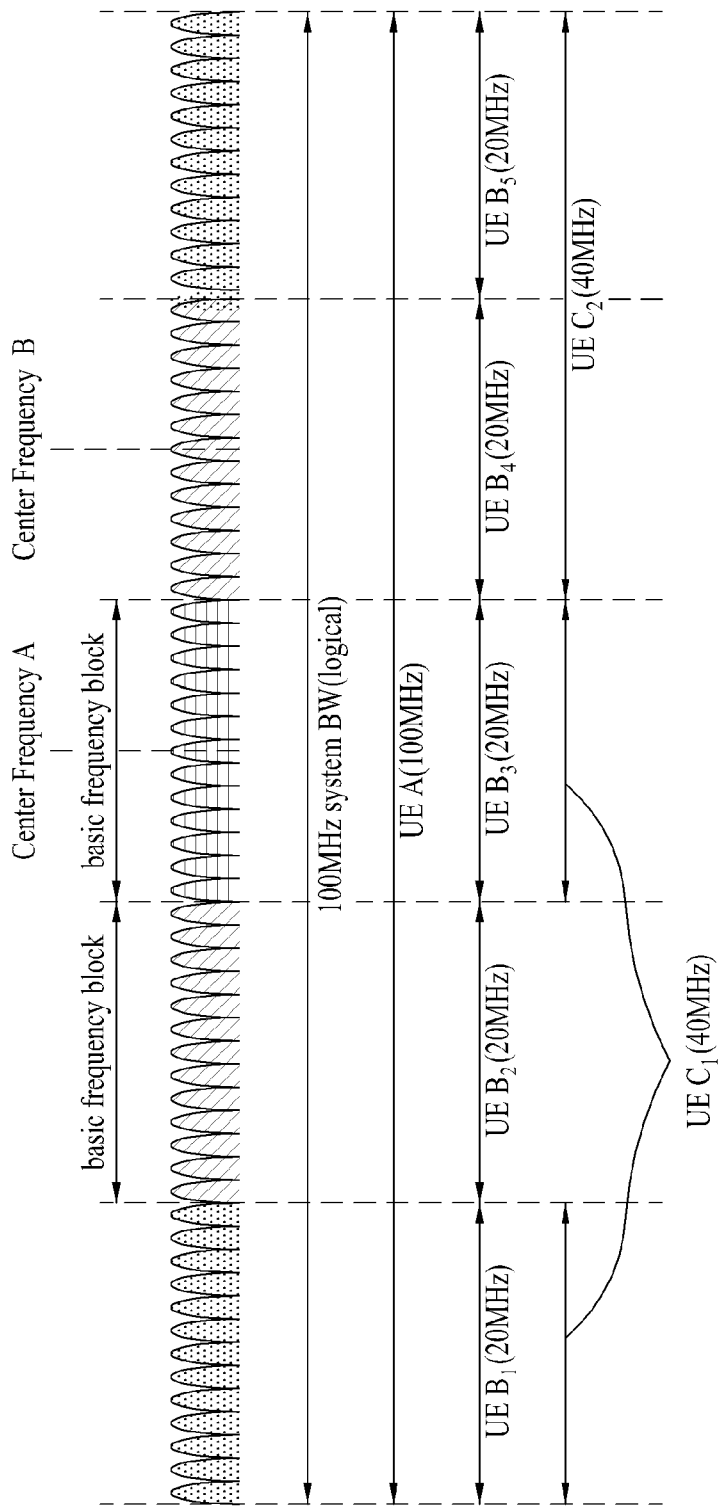
FIG. 7 is a conceptual diagram illustrating a carrier aggregation (CA) scheme.

Carrier aggregation will hereinafter be described in detail. FIG. 7 is a conceptual diagram illustrating carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 7, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 7, this is only exemplary and the CCs may have different bandwidths. Although the CCs are shown as being contiguous in the frequency domain in FIG. 8, FIG. 8 merely shows the logical concept and thus the CCs may be physically contiguous or separated.

Different center frequencies may be used for the CCs or one common center frequency may be used for physically contiguous CCs. For example, in FIG. 7, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs B1 to B5 may only use a bandwidth of 20 MHz and perform communication using one CC. Each of UEs C1 and C2 may use a bandwidth of 40 MHz and perform communication using two CCs. The two CCs may be contiguous or non-contiguous. The UE C1 uses two non-contiguous CCs and the UE C2 uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Figure 8:
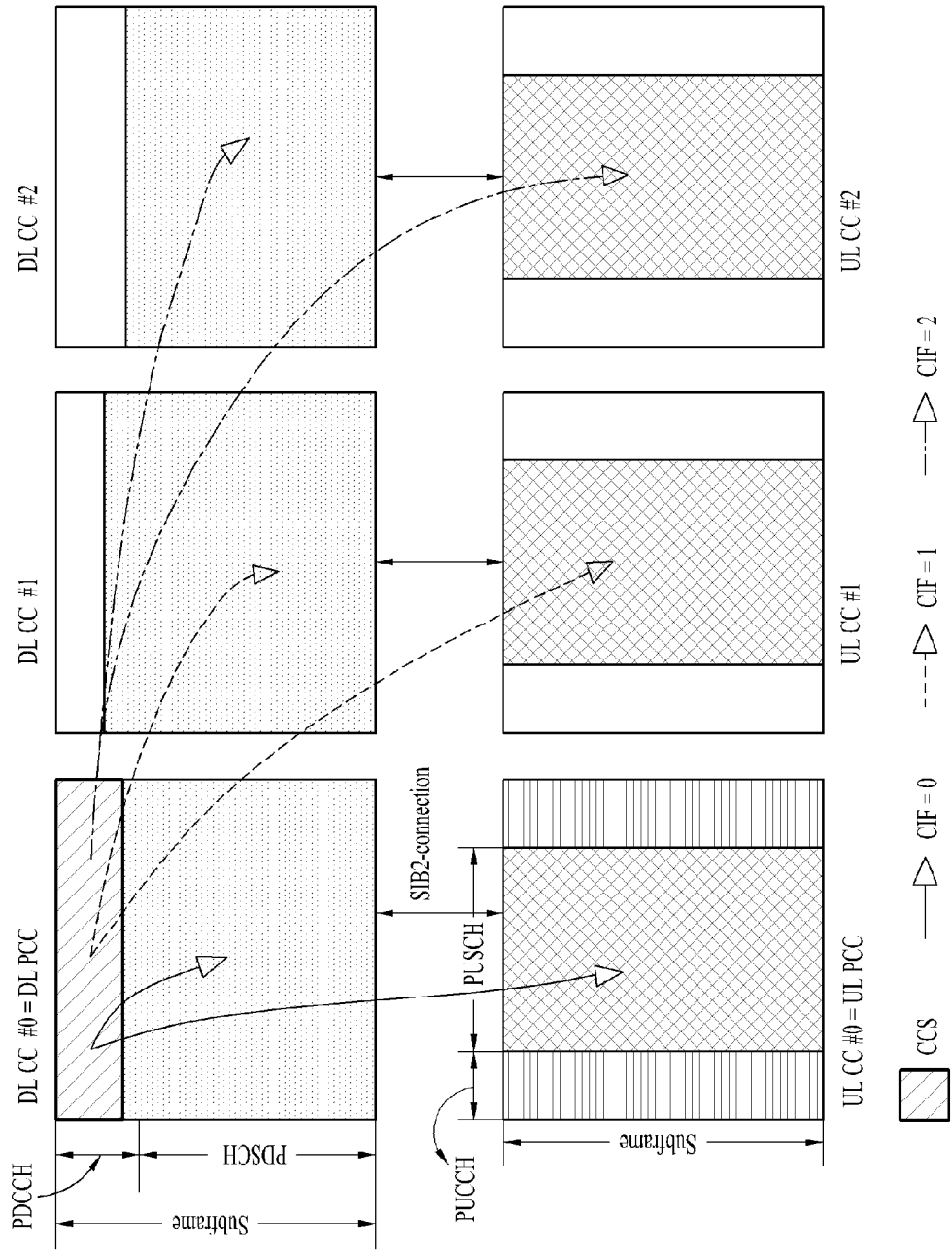
FIG. 8 is a conceptual diagram illustrating a cross-carrier scheduling scheme.

FIG. 8 is a conceptual diagram of a cross carrier scheduling scheme. Specifically, as can be seen from FIG. 8, the number of cells (or CCs) allocated to a relay node (RN) is set to 3, cross carrier scheduling is carried out using a CIF as described above. In this case, it is assumed that a downlink cell (or CC) #A is set to a primary downlink CC (i.e., a primary cell PCell), and the remaining CCs #B and #C are used as secondary cells (SCells).

The present invention relates to an EPDCCH structure, and more particularly to a method for selecting the number of PRBs allocated to EPDCCH and a method for signaling this selection method.

EPDCCH is designed to improve capacity of a control channel, and can be transmitted to the legacy PDSCH region on the basis of DMRS so as to obtain a beamforming region. For EPDCH transmission, the eNB (or network) may signal specific information regarding an EPDCCH transmission region to each UE. More specifically, the eNB may inform the UE of K EPDCCH sets. Each EPDCCH set is composed of N PRB pairs, and different EPDCCH sets may have different N values. In addition, each EPCCH set may be classified into a localized EPDCCH transmission purpose and a distributed EPDCCH transmission purpose, and each EPDCCH set may entirely or partially overlap with another EDPCCH set.

Configuration of N

N indicating the number of PRB pairs constructing each EPDCCH set may be affected by a bandwidth (BW) of a scheduling cell (hereinafter referred to as PCell) of EPDCCH and a bandwidth (BW) of a cell (hereinafter referred to as SCell) scheduled by EPDCCH. In case of PCell, if a sufficient BW (e.g., a narrow-bandwidth system) is not given, the amount of resources capable of being allocated for EPDCCH is limited, so that a relatively small value needs to be assigned to N. Therefore, the number of RBs capable of being allocated for EPDCCH is limited according to a PCell BW. If the PCell BW is associated with the upper limit of N allocated to EPDCCH transmission, SCell BW is associated with the lowest limit of N allocated to EPDCCH transmission. The higher the SCell BW, the higher the EDPCCH DCI payload, such that a minimum number of RBs needed for transmission of the corresponding DCI is also increased. Therefore, considering the PCell BW and the SCell BW, N needs to be assigned a higher value than a minimum number of RBs needed for EPDCCH transmission according to the SCell BW, and the upper limit of N for use in PCell is set to a maximum number of RBs capable of being allocated to EPDCCH transmission.

Therefore, the N value can be properly selected on the basis of a BW of a PCell in which EPDCCH is transmitted. In one example, a specific threshold BW value (T1) is decided so that N is set to N1 at BW of T1 or less. If the BW value is higher than T1, N may be set to N2 (N1≤N2). In this case, each of N1 and N2 may be the set of N values capable of being configured, and a threshold value may be classified into two or more steps. For example, N may be decided as represented by the following equation.

If BW≤$T1$, then $N1$ (for example, $\{2, 4\}$)

Otherwise, N2 (for example, $\{4, 8\}$)

That is, N may be set to 2 or 4 at a BW that is equal to or less than T1 RBs, and N may be set to 4 or 8 at a BW higher than T1 RBs.

In another method, the N value can be properly selected on the basis of a BW of SCell scheduled by EPDCCH. In one method, a specific threshold BW value and a T2 value are decided, so that N may be set to N3 at a BW less than T2 and N may be set to N4 at a BW higher than T2 (N3≤N4). In this case, each of N3 and N4 may be the set of N values capable of being configured, and a threshold value may be configured according to two or more steps. For example, N may be decided as represented by the following equation.

If BW≤$T2$, then $N3$ (for example, $\{2, 4\}$)

Otherwise, N4 (for example, $\{4,8\}$)

That is, N may be set to 2 or 4 at a BW that is equal to or less than T2 RBs, and N may be set to 4 or 8 at a BW higher than T2 RBs.

A threshold value of PCell and a threshold value of SCell may be simultaneously applied. In this case, a configurable N value of PCell and a configurable N value of SCell may be different from each other in certain BW combinations from among available BW combinations of PCell and SCell. Therefore, a configuration value of a cell having a smaller N value from among N values of PCell and SCell may be used. In other words, the range of configurable N value may be decided according to the SCell BW, and N may be limited to the range of a maximum number of RBs capable of being allocated to PCell.

Figure 9:
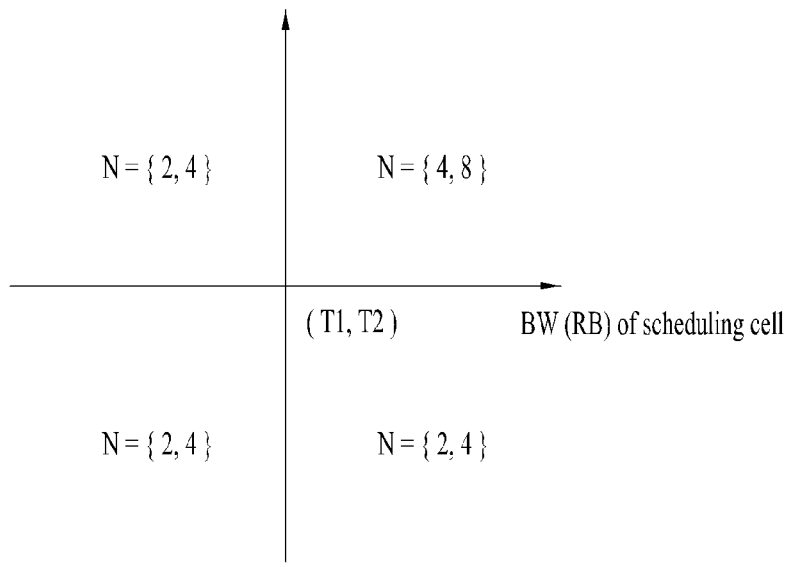
FIG. 9 is a conceptual diagram illustrating a method for deciding the number of PRB pairs contained in an EPDCCH set according to one embodiment of the present invention.

For example, if a threshold value of PCell and a threshold value of SCell are simultaneously applied to the above-mentioned example, the configuration range of an available N is shown in FIG. 9. If PCell can support up to {2, 4} on the condition that SCell supports {4, 8} (i.e., BW of scheduling cell≤T1 and BW of scheduled cell>T2), the available N configuration range may satisfy values of PCell. Likewise, if SCell supports up to {2, 4} on the condition that PCell supports {4, 8} (i.e., BW of scheduling cell>T1 and BW of scheduled cell≤T2), the available N configuration range may satisfy values of SCell.

A detailed description of a method for signaling N to a UE after completion of N decision is as follows.

A method for informing a UE of an index value of a configurable N through RRC signaling will hereinafter be described in detail. If two configurable N values are given as in the case of using the threshold value T1, 1-bit flag can be more simply used. For example, if 'flag=0' and 'BW≤T1' are given, N is set to 2 (N=2). If 'flag=0' and 'BW>T1' are given, N is set to 4 (N=4). If 'flag=1' and 'BW≤T1' are given, N is set to 4 (N=4). If 'flag=1' and 'BW>T1' are given, N is set to 8 (N=8).

In another method, a specific threshold value is configured, the UE determines whether an objective value is higher than the threshold value, such that it is possible to determine/select which one of N values will be used. The threshold value may be configured in the number of available REs/PRB pairs, etc.

The number of available REs/PRB pairs<$X_{thresh}$ (=104)
    If BW≤T1, then N={4}
    Otherwise, N={8}
    The number of available REs/PRB pairs≥$X_{thresh}$ (=104)
    If BW≤T1, then N={2}
    Otherwise, N={4}

Figure 10:
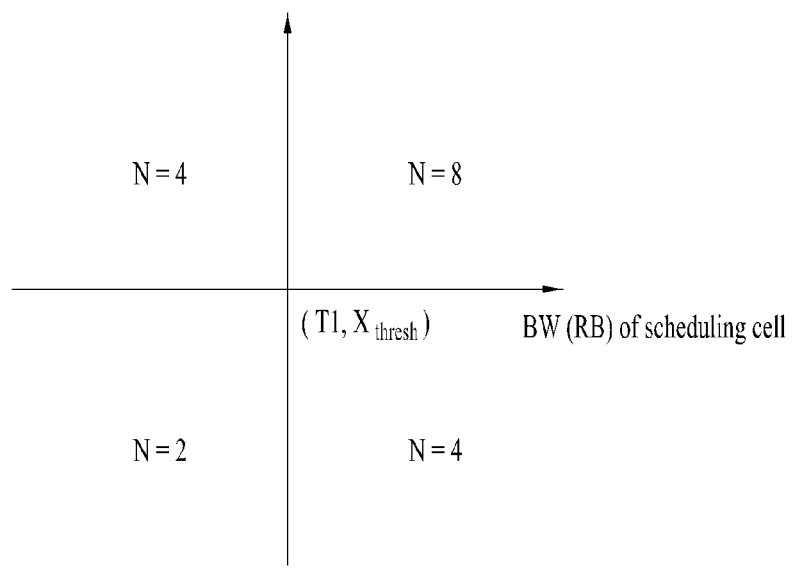
FIG. 10 is a conceptual diagram illustrating a method for deciding PRB pairs contained in an EPDCCH set according to one embodiment of the present invention.

For example, the above-mentioned method can be defined as the above expressions, and a detailed description thereof is shown in FIG. 10.

PRB Allocation for EPDCCH Set

As described above, each EPDCCH set may be composed of N PRB pairs, and the UE may obtain configuration of N PRB pairs constructing an EPDCCH set through RRC signaling. In this case, specific information as to which PRB from among all PRB sets will be used as EPDCCH may be applied to the UE using the following scheme.

A method for using bitmap will hereinafter be described. For example, assuming that the entire DL system bandwidth is composed of $N_{tot}$ RBs, specific information as to whether each RB is allocated to EPDCCH may be signaled using $N_{tot}$ bits. If the n-th bit is enabled (i.e., if the n-th bit is denoted by "1"), this means that the n0th RB is allocated to EPDCCH. Bits indicating RB(s) are not always sequentially mapped, and may be mapped in a RB-to-bit format according to a predetermined rule. Two or more RBs are configured to form a first group, such that EPDCCH may be allocated to the RB group and may be indicated by bitmap.

Figure 11:
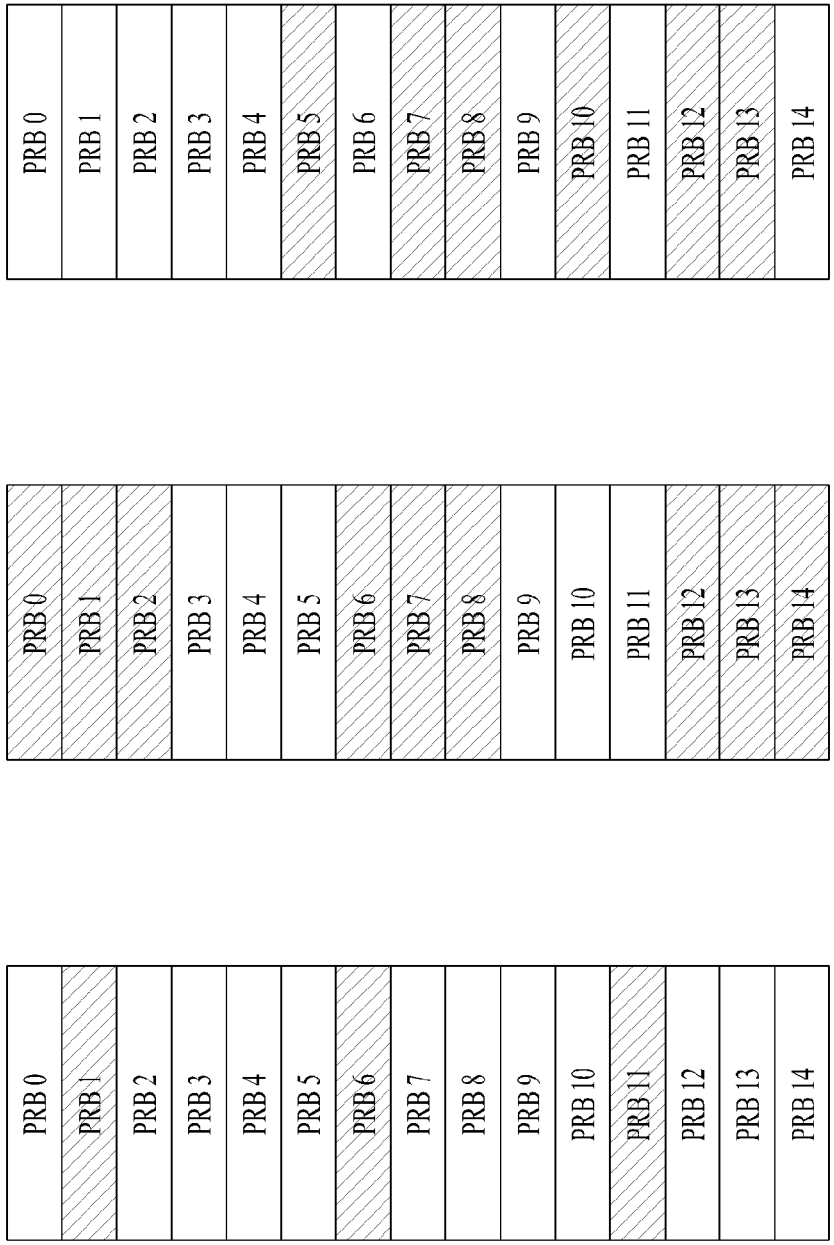
FIG. 11 is a conceptual diagram illustrating an example for indicating PRB pairs contained in an EPDCCH set according to one embodiment of the present invention.

FIG. 11 shows an example in which the entire band is composed of 15 RBs for convenience of description and better understanding of the present invention. In FIG. 11, bitmap may be configured in any form of (a) 010000100001000, (b) 111000111000111, and (c) 000001011010110. Assuming that 3 RBs are configured to form one group as shown in the form (b), the bitmap may be configured as shown in '(b) 10101'.

In another method, a combination of a number of a start RB and the number of contiguous RBs may be signaled.

In another method, indexes of the corresponding pattern are signaled according to the predefined pattern, such that PRB information allocated to EPDCCH can be transferred. For example, assuming that N RBs are allocated to EPDCCH, floor (i.e., system BW/N) patterns in which individual RBs are distributed at equal intervals within the entire system band may be considered and used. The eNB or BS may indicate the corresponding allocation using ceiling (log 2 (the number of patterns)) bits.

FIG. 11(a) shows the exemplary case of $N_{tot}$=15 and N=3. If the equal-spacing distribution pattern is defined for the entire system band, a spacing between RBs constructing a specific pattern is denoted by "15RB/3=5RB" and 5 patterns are present. If the smallest RB index of each pattern is used as the pattern index, FIG. 11(a) shows a specific pattern corresponding to 'pattern index=1' from among 5 patterns.

Through a combination of intervals that are not defined by an arbitrary start PRB index and a system bandwidth/N, PRBs spaced apart from the corresponding start PRB index by a predetermined distance can be selected for EPDCCH. In this case, if indexes (or locations) of PRB pairs constructing the corresponding EPDCCH set exceed the range of a system BW, a cyclic shifting calculation scheme of the corresponding PRB-pair index (or location) may be used. In this case, the cyclic shifting calculation scheme may be represented by "PRB pair index (or location) mod the number of PRB pairs constructing the system BW".

Likewise, the pattern may also be constructed using a combination of intervals that are not defined by the arbitrary start PRB index and the system BW/N, and an arbitrary pattern may be defined so that indexes may be allocated to each pattern.

Aggregation Level and Construction of the Number of Corresponding Blind Decoding Times On the other hand, if N (i.e., the number of PRB pairs) allocated to EPDCCH has a low value in the same manner as in the narrow band system, it may be difficult to construct a search space in a high aggregation level (AL). For example, if N=2 is configured, each PRB pair includes 4 ECCEs, it may be impossible to configure the search space of AL=8 or higher. If each PRB pair includes 2 ECCEs, it may be impossible to configure the search space of AL=4 or higher. Therefore, the search space of the corresponding AL may be allocated to another AL. That is, blind decoding complexity (i.e., the number of blind decoding attempts) of the EPDCCH set of the UE is constantly maintained, resulting in performance improvement.

Therefore, the number of blind decoding times of each AL (i.e., the number of PDCCH candidates) may be differently configured according to each EPDCCH set allocated to the UE. For example, if ALs higher than the number of ECCEs contained in the EPDCCH set are configured, all the ePDCCH candidates for the corresponding ALs may be allocated to the lowest AL or may be maximally and evenly allocated to ALs lower than the corresponding AL. For example, assuming that {6,6,2,2} is assigned to PDCCH or ePDCCH candidate (hereinafter referred to as a candidate) associated with AL={1,2,4,8}, if N=2 and the number of ECCEs per PRB pair (i.e., # of ECCE/PRB pair) is set to 2, the number of ECCEs per EPDCCH set (# of ECCE/EPDCCH set) is set to 4, BLD for AL=8 is not performed. Therefore, two candidates capable of being allocated to AL=8 are not initially allocated (□), may be allocated to AL=1 corresponding to the lowest AL (□), or and may be sequentially allocated in the range from the lowest AL to a maximum allowable AL (□).

TABLE 5

| Aggregation level | # of BD | | | |
|---|---|---|---|---|
| | Legacy | □ | □ | □ |
| 1 | 6 | 6 | 8 | 7 |
| 2 | 6 | 6 | 6 | 7 |
| 4 | 2 | 2 | 2 | 2 |
| 8 | 2 | 0 | 0 | 0 |

The number of candidates for each AL may be transferred to the UE through RRC signaling or the like. That is, the eNB may configure not only N but also the number of candidates of each Al when configuring the EPDCCH set. For example, when one EPDCCH set is configured, the number of BD attempt times may be set to (# of BD)={6,6,2,2} in association with each of AL={1, 2, 4, 8}. In order to reduce signaling overhead, the number of configurable combinations of (# of BD) is preset to a finite number and may be configured by the corresponding indexes only.

TABLE 6

| index | # of BD for each aggregation level |
|---|---|
| 0 | {6, 6, 2, 2} |
| 1 | {8, 4, 2, 2} |
| 2 | {4, 4, 4, 4} |
| ... | ... |

It is obvious to those skilled in the art that the term "AL" described in the above-mentioned embodiment is only exemplary and may be set to another value through the predefined rule or signaling. Likewise, the number of BD attempt times interworking with (or allocated to) a specific AL may be assigned a different value (through the predefined rule or signaling). For example, in association with this different value, the number of BD attempts associated with each of AL={1, 2, 4, 8} may be respectively configured as {6,6,2,2}.

In this case, exception processing of the case in which the number (# of ECCE within a configured EPDCCH set) of ECCEs contained in the configured EPDCCH set is less than a specific AL may be directly or indirectly carried out. In case of using the direct scheme, the eNB selects an appropriate scheme and re-distributes the number of candidates so as to perform UE reconfiguration, or the eNB may transfer an index corresponding to a new combination to the UE.

In case of using the indirect scheme, if exception occurs, the UE may perform exception processing according to a predetermined rule. For example, assuming that an exception processing matter between the eNB and the UE occurs and the scheme is promised to be used, the UE does not perform blind decoding (BD) for a non-supported AL, and satisfies initial configuration of the remaining AL without change.

In case that the number (# of ECCE within a configured EPDCCH set) of ECCEs in the configured EPDCCH set is less than a specific AL, (# of ECCE within a configured EPDCCH set) may be affected by the N value, the AL at which the number (# of ECCE/PRB pair) of ECCEs per PRB pair should be changed or supported is changed to another, the above-mentioned case may occur.

In accordance with one example in which the number (# of ECCE within a configured EPDCCH set) of ECCEs contained in the configured EPDCCH set is changed to another in association with the same N, the number (# of ECCE/PRB pair) of ECCEs per PRB pair in a specific-type subframe such as a special subframe may be reduced to 1/k of another subframe. In this case, if N is set to the same value, the number "(# of ECCE within a configured EPDCCH set) (=# of ECCE within N PRB pair)" of ECCEs contained in the configured EPDCCH set may be reduced to 1/k. In another example, AL may be changed to another and CSI-RS signals may be allocated to the corresponding subframe, and the number (# of RE/PRB pair) of REs per available PRB pair is reduced to 1/m. In this case, AL to be supported is increased m times, and a detailed description thereof is summarized as follows.

# of ECCE within N PRB pair≤(or <) AL may occur in the following cases 1), 2), and 3).

1) N is reduced→N configuration may be achieved for N increment
2) # of ECCE/PRB pair reduction
3) AL increment The first case (1) and a method for allocating the number of BD attempt times for use in the first case (1) have already been disclosed. As one example of the second case (2), if "# of ECCE/PRB pair=4" is decided at N=2, this means that AL may be assigned a maximum value of 8 as denoted by AL=8. However, if "# of ECCE/PRB pair" is changed to 2 (# of ECCE/PRB pair=2), AL may be assigned a maximum value of 4 as denoted by AL=4. As one example of the third case (3), when (# of RE/PRB pair) is reduced to 104 or less, there may arise another case in which AL to be supported may be changed from {1,2,4,8} to {2,4,8,16}. If the number of available REs per PRB pair is less than 104, it may be difficult to transmit DCI payload using only one ECCE. For example, a normal subframe having a normal CP may be configured by 4 ECCEs per PRB pair. In this case, if the number of available REs per PRB pair is less than 104, 26 or less REs may be contained in each ECCE, so that it may be difficult to perform DCI loading. Accordingly, a minimum AL is increase by one step, and many more ECCEs are contained in EPDCCH, such that DCI can be transmitted. In this case, if N=2 and "# of ECCE/PRB pair=4" are given, it may be impossible to configure "AL=16".

Even in the second case 2) and the third case 3), if a non-supported AL occurs in the same manner as in the first case 1), the number (i.e., the number of EPDCCH candidates) of BD attempts allocated to the corresponding AL may be allocated to another AL using any one of the third methods (□, □, and □).

A different value may be assigned to AL as necessary. For example, AL may be limited to 4 or less only in the case of localized transmission (so that all candidates can be configured in one PRB pair.) As described above, if only AL having a smaller range than the preconfigured AL combination is supported, the number of BD attempts for each AL may be derived and decided from the number of BD attempts for the preconfigured AL combination using any one of the above-mentioned methods (□, □, and □).

BD Candidate Allocation for Plural EPDCCH Sets

On the other hand, the UE may be configured as at least two EPDCCH sets. In this case, the BD candidate may be classified according to each EPDCCH set, and the number of candidates allocated to available Als of each EPDCCH set may be configured by the network or may be decided by an implicit rule. However, a total number of BD candidates needs to be maintained at a level similar to the legacy level.

In order to allocate the number of BD candidates according to the implicit rule, it is necessary to design a predetermined rule applicable to the number of configurable EPDCCH sets, a transmission (Tx) mode, and an available Al combination.

For example, a maximum of two EPDCCH sets may be configured, and AL may consider an exemplary case in which each EPDCCH set can support {1, 2, 4, 8}. In this case, the number of BD candidates may be decided as shown in the following Table 7.

TABLE 7

| AL | Set 1 | Set 2 |
|---|---|---|
| 1(2) | 3 | 3 |
| 2(4) | 3 | 3 |
| 4(8) | 1 | 1 |
| 8(16) | 1 | 1 |

If a specific set cannot support all ALs, BD performance for a non-supported AL may be independently distributed to another AL for each set, or BD for the corresponding AL may not be performed.

In another method, the number of BD candidates for each AL may be constantly maintained within the entire set. If all ALs are not supported in a specific set and the remaining sets support the corresponding AL, the BD candidate for the non-supported AL can be supported from the remaining sets. If the corresponding AL is not supported even in other sets, reallocation of the BD candidate can be achieved within the same set. In this case, another set may include a legacy PDCCH. In case of (# of REs/PRB pair<$X_{thresh}$), if a supportable Al is changed to {2,4,8,16} and the number (N1) of PRB pairs of the set 1 is set to 2, it is impossible to construct "AL=16" in the corresponding set, and two candidates can be allocated to "AL=16" of the set 2. If the number (N2) of PRB pairs of the set 2 is not sufficient to support to the two candidates (for example, N2=4), the corresponding BD candidate may be allocated to AL=2 or the like.

TABLE 8

| | Set 1 (N1 = 2) | Set 2 (N2 = 8) |
|---|---|---|
| 2 | 3 | 3 |
| 4 | 3 | 3 |
| 8 | 1 | 1 |
| 16 | 0 | 2 |

TABLE 9

| | Set 1 (N1 = 2) | Set 2 (N2 = 4) |
|---|---|---|
| 2 | 3 | 4 |
| 4 | 3 | 3 |
| 8 | 1 | 1 |
| 16 | 0 | 1 |

On the other hand, a primary set having a predetermined level of N is defined, and a secondary set having special limitation to N may be defined within the configurable range. A predetermined value is assigned to the level (N) of the primary set, and a minimum N value capable of supporting a maximum AL can be promised in the arbitrary configuration. For example, assuming that "# of ECCEs/PRB pair=4" and "maximum AL=16" are given, or assuming that "# of ECCEs/PRB pair=2" and "maximum AL=8" are given, if a maximum value of N is given, a minimum N value of the primary set may be set to 4. In this case, if it is impossible to assign a predetermined number or higher to a maximum number of AL candidates (the candidate mapped to the same ECCE occurs), it is necessary to configure the N value in consideration of a maximum number of candidates. For example, if N=4 is given, only one candidate for AL=8 can be configured. Therefore, if two or more candidates of AL=8 are allocated, N of the primary set may be assigned 8 or higher.

Since the primary set guarantees a maximum AL, AL is classified into a high AL "high" and a low AL "low", ALs contained in "high" may be assigned to the primary set, and ALs contained in "low" may be assigned to the secondary set. As an absolute method for discriminating between "high" and "low", an arbitrary AL (e.g., AL=4) or higher may be configured in "high". Alternatively, the above-mentioned method may also be decided in consideration of a relative level of the configurable AL. For example, in case of supporting "AL=1, 2, 4, 8", AL=1,2 may be identified by "low" and AL=4,8 may be identified by "high". If (# of REs/PRB pair<$X_{thresh}$) is changed and AL is also changed to {2,4,8,16}, AL=2,4 may be identified by "low" and AL=8,16 may be identified by "high". In case of using the above-mentioned method, the BD candidate is allocated as follows.

TABLE 10

| AL | Primary Set (N1 = 8) | Secondary Set (N2 = 2) |
|---|---|---|
| 1(2) | 0 | 6 |
| 2(4) | 0 | 6 |
| 4(8) | 2 | 0 |
| 8(16) | 2 | 0 |

In case of the secondary set, assuming that it is impossible to configure a specific AL at the configured N value due to insufficiency of available resources, the corresponding AL candidate may be allocated only to the primary set. For example, assuming that the secondary set is configured as N2=2 and (# of REs/PRB pair<$X_{thresh}$) is given, if AL is changed from {1,2,4,8} to {2,4,8,16}, it is impossible to configure the candidate having AL=16 within the secondary set. In this case, the candidate corresponding to AL=16 may be entirely allocated to the primary et.

TABLE 11

| AL | Primary Set (N1 = 8) | Secondary Set (N2 = 2) |
|---|---|---|
| 2 | 3 | 3 |
| 4 | 3 | 3 |
| 8 | 1 | 1 |
| 16 | 2 | 0 |

The above-mentioned concept can also be applied to the exemplary case (See Table 10) in which AL is classified into a high AL "high" and a low AL "low" so that only the low AL can be allocated. Although only the low AL is assigned, an excessively low value may be assigned to N, or the subframe type is changed, such that a higher N value is needed for the same AL due to reduction of "# of ECCE/PRB pair". (Likewise, due to reduction of (# of RE/PRB pair), AL is increased so that a higher N value is needed for the same DCI transmission).

The implicit rule is applied to the above-mentioned scheme. Assuming that AL for each EPDCCH set and the number of BD candidates corresponding to each AL are predefined, the above-mentioned scheme may be used when arbitrary EPDCCH sets are allocated. In another method, the network allocates the number of BD candidates for each EPDCCH set and may inform the UE of the allocated information. In this case, the network may allocate the BD candidate to AL of each set using the same method.

If the network configures the number of BD candidates, an arbitrary combination having full flexibility may be considered under limitation (having a similar level as in the legacy art) regarding a total number of BD candidates. In this case, non-negligible overhead may occur. Accordingly, the number of BD candidates may be calculated according to the implicit rule, and an exceptional situation in which a specific AL cannot be configured at the same N value due to change of the subframe type can be decided according to the implicit rule.

Exceptional processing in which the number of ECCEs contained in the configured EPDCCH set is less than AL has already been disclosed in detail. That is, when the number of BD candidates is allocated to each AL, the number of candidates capable of being configured by a specific AL may be limited. As described above, if it is impossible to construct as many candidates as a predetermined number of BD candidates in the corresponding AL, the number of the remaining BD candidates is allocated to another AL. In this case, the number of remaining candidates may be re-allocated in a manner that the remaining BD candidates can sequentially fill the individual ALs starting from the highest AL from among ALs of the corresponding AL or less. That is, the number of redundant BD candidates obtained after the BD candidates are allocated to a maximum AL from among ALs of the corresponding AL or less may be primarily allocated to the next high AL, such that this BD candidate allocation scheme can be repeated as described above. The above-mentioned process may be performed to the range of the smallest AL, or may be repeatedly performed to a predetermined minimum AL. If the remaining BD candidates are present after completion of allocation to a minimum AL within the corresponding set, the corresponding BD candidate may not be allocated any more, or may be transferred to another set.

As described above, the operation for giving priority of the BD candidate allocation to a high AL may be used to guarantee candidates for the case in which DCI is transmitted using the high AL. That is, assuming the operation for constructing a relatively high AL is limited by the number of ECCEs constructing EPDCCH, the corresponding candidate is reallocated to the next order AL (i.e., the next high AL), such that it has fairness with the relatively low AL. For example, if a high AL is needed in a poor channel environment, the operation for allocating an additional candidate to the low AL having a sufficient number of candidates may be meaningless.

For example, if a reference (AL=L) is provided in a given situation, it is assumed that {6, 6, 2, 2} BD candidates can be allocated to AL=L, 2L, 4L, 8L, respectively, such that the above-mentioned embodiment is based on the above assumption. In this case, assuming that 8 PRB pairs are given, a total of 32 ECCEs may be generated and a reference (L=4) is assumed, and it is also assumed that AL=32 is not present due to consumption of the excessive amount of resources. Two candidates for AL=32 corresponding to 8L may be allocated to another AL, and may attempt to perform allocation to the highest AL (AL=16) from among ALs lower than 'AL=32', and two candidates present in 'AL=16' consume all of 32 ECCEs, such that it is impossible to allocate the additional candidate to AL=16. Therefore, allocation to AL=8 corresponding to the next AL is attempted, and 32 ECCEs can make a total of four 'AL=8' candidates, such that two candidates from among 6 allocation candidates remain unused. Therefore, a total of four redundant candidates may attempt to perform allocation to AL=4. A total of 8 candidates may be present in case of AL=8, such that two redundant candidates are allocated to AL=4 and the last two redundant candidates are allocated to AL=2. As a result, {0, 2, 8, 4, 2} candidates are respectively allocated to AL=1, 2, 4, 8, 16.

The following Table 12 shows an exemplary case in which the BS candidate is allocated in response to each situation. In this case, if a reference level is set to 4, it is assumed that no ePDCCH set is configured as two PRB pairs, and it is also assumed that AL=1 is not present in case of "Reference L=4".

TABLE 12

|  | Reference L = 1 | Reference L = 2 | Reference L = 4 |
| --- | --- | --- | --- |
| 2 PRB pairs | {8, 4, 2, 1, 0} | {0, 4, 2, 1, 0} | — |
| 4 PRB pairs | {6, 6, 2, 2, 0} | {0, 8, 4, 2, 1} | {0, 8, 4, 2, 1} |
| 8 PRB pairs | {6, 6, 2, 2, 0} | {0, 6, 6, 2, 2} | {0, 2, 8, 4, 2} |

In addition, the following table shows an exemplary case in which the BD candidate is allocated to two EPDCCH sets on the basis of a reference applied to the above-mentioned embodiment. In this case, N1 denotes the number of PRB pairs of a first EPDCCH set 1, and N2 denotes the number of PRB pairs of a second EPDCCH set 2. BW denotes a system bandwidth, and Min AL indicates a minimum AL capable of being transmitted in a given subframe. MinAL may be changed in the case in which the number of available REs per PRB pair is at a relatively low number as described above. For example, if the number of available REs per PRB pair is less than 104, MinAL may be changed to 2. The reference L for use in the following table is assumed as follows.

Reference L=4

Case in which Min AL is 2 (MinAL=2) and DCI format 2 series are used under the condition that BW is larger than 25*RB Reference L=2

Case in which Min AL is 2 (MinAL=2) and DCI format 0/1 series are used under the condition that BW is larger than 25*RB Case in which Min AL is 1 (MinAL=1) and DCI format 2 series are used under the condition that BW is larger than 25*RB Case in which Min AL is 2 (MinAL=2) and DCI format 0/1 series are used under the condition that BW is larger than 25*RB Case in which Min AL is 2 (MinAL=2) and DCI format 2 series are used under the condition that BW is larger than 25*RB Reference L=1

In the remaining cases other than the above cases:

In this case, it is assumed that the BD candidate is equally allocated to each EPDCCH set. That is, generally, {3,3,1,1} candidates are respectively allocated to AL=L, 2L, 4L, 8L.

TABLE 13

| BW | N1 | N2 | Min AL = 1 DCI format 0/1/1A/... | Min AL = 1 DCI format 2/2B/2C/2D... | Min AL = 2 DCI format 0/1/1A/... | Min AL = 2 DCI format 2/2B/2C/2D... |
|---|---|---|---|---|---|---|
| <=25 RB | 2 | 0 | {8, 4, 2, 1, 0}, {0, 0, 0, 0, 0} | {8, 4, 2, 1, 0}, {0, 0, 0, 0, 0} | {0, 4, 2, 1, 0}, {0, 0, 0, 0, 0} | {0, 4, 2, 1, 0}, {0, 0, 0, 0, 0} |
| <=25 RB | 2 | 2 | {3, 3, 1, 1, 0}, {3, 3, 1, 1, 0} | {3, 3, 1, 1, 0}, {3, 3, 1, 1, 0} | {0, 4, 2, 1, 0}, {0, 4, 2, 1, 0} | {0, 4, 2, 1, 0}, {0, 4, 2, 1, 0} |
| <=25 RB | 4 | 0 | {6, 6, 2, 2, 0}, {0, 0, 0, 0, 0} | {6, 6, 2, 2, 0}, {0, 0, 0, 0, 0} | {0, 8, 4, 2, 1}, {0, 0, 0, 0, 0} | {0, 8, 4, 2, 1}, {0, 0, 0, 0, 0} |
| <=25 RB | 4 | 2 | {3, 3, 1, 1, 0}, {3, 3, 1, 1, 0} | {3, 3, 1, 1, 0}, {3, 3, 1, 1, 0} | {0, 3, 3, 1, 1}, {0, 4, 2, 1, 0} | {0, 3, 3, 1, 1}, {0, 4, 2, 1, 0} |
| <=25 RB | 4 | 4 | {3, 3, 1, 1, 0}, {3, 3, 1, 1, 0} | {3, 3, 1, 1, 0}, {3, 3, 1, 1, 0} | {0, 3, 3, 1, 1}, {0, 3, 3, 1, 1} | {0, 3, 3, 1, 1}, {0, 3, 3, 1, 1} |
| >25 RB | 4 | 0 | {6, 6, 2, 2, 0}, {0, 0, 0, 0, 0} | {0, 8, 4, 2, 1}, {0, 0, 0, 0, 0} | {0, 8, 4, 2, 1}, {0, 0, 0, 0, 0} | {0, 8, 4, 2, 1}, {0, 0, 0, 0, 0} |
| >25 RB | 4 | 4 | {3, 3, 1, 1, 0}, {3, 3, 1, 1, 0} | {0, 3, 3, 1, 1}, {0, 3, 3, 1, 1} | {0, 3, 3, 1, 1}, {0, 3, 3, 1, 1} | {0, 1, 4, 2, 1}, {0, 1, 4, 2, 1} |
| >25 RB | 8 | 0 | {6, 6, 2, 2, 0}, {0, 0, 0, 0, 0} | {0, 6, 6, 2, 2}, {0, 0, 0, 0, 0} | {0, 6, 6, 2, 2}, {0, 0, 0, 0, 0} | {0, 2, 8, 4, 2}, {0, 0, 0, 0, 0} |
| >25 RB | 8 | 4 | {3, 3, 1, 1, 0}, {3, 3, 1, 1, 0} | {0, 3, 3, 1, 1}, {0, 3, 3, 1, 1} | {0, 3, 3, 1, 1}, {0, 3, 3, 1, 1} | {0, 0, 3, 3, 2}, {0, 1, 4, 2, 1} |

The reference level L is not always limited to values used in the above example, and is not always fixed to values used in the above table. That is, L may also be set to any of the remaining values other than 1, 2, and 4. EPDCCH localized or distribute scheme and other EPDCCH properties are additionally considered so that other L values may also be considered in the same condition as in the above table.

On the other hand, when a certain configuration is achieved through comparison between a specific threshold value and other values according to the embodiments, it is obvious to those skilled in the art that the term ("below" or "above") including a specific threshold value, or the term ("less than" or "higher than") including the specific threshold value may or may not include a specific threshold value.

Meanwhile, the reference level L for each EPDCCH set may be differently configured. For example, each EPDCCH set may be transferred from different TPs according to the same scenario as in DPS. In this case, If TP1 uses 2-port—CRS and TP2 uses 4-port—CRS, the number of available REs of EPDCCH set 1 transmitted from TP1 in a single PRB pair may be higher than $X_{thresh}$, and the number of available REs of EPDCCH set 2 transmitted from TP2 may be less than $X_{thresh}$. Accordingly, the reference level L for use in EPDCCH set 1 may be assigned L1=1, and the reference level L for use in EPDCCH set 2 may be assigned L2=2.

As described above, if different reference levels (L) are assigned to individual EPDCCH sets, the following two schemes for splitting the BD candidate to the individual sets may be used.

First Step: Assuming that individual EPDCCH sets have the same reference level L and the BD candidate is split, splitting of the BD candidate is performed.

That is, assuming that L1=1 of EPDCCH set 1 and L2=2 of EPDCCH set 2 are given, it is assumed that L=1 is assigned to two sets or the BD candidate can be split on the assumption of L=2. For example, if N1=4 and L1=1 are assigned for the set 1, and if the N2=8 and L2=2 are assigned for the set 2, BD allocation can be achieved as follows.

Set 1: If L=1 and N1=4 are given, (# of BD candidate={3, 3,1,1,0}) for AL={1,2,4,8,16} can be decided.

Set 2: If L=1 and N2=8 are given, (# of BD candidate={3, 3,1,1,0}) for AL={1,2,4,8,16} can decided.

Second Step: Different L values can be corrected. In the first step, assuming that BD allocation is performed at L=L1 (i.e., if it is assumed that the reference level L is set to L1 in the first step on the condition that L1 and L2 are different from each other), it is necessary to coordinate AL of the BD candidate of EPDCCH set (i.e., EPDCCH set 2) having L2. If it is impossible to support all the BD candidates allocated to a maximum AL after completion of coordination, a redundant BD candidate incapable of supporting other ALs can be reallocated. The reallocation scheme may use any one of the above-mentioned schemes. The following sets 1 and 2 can be obtained through coordination of BD allocation of the set 2.

Set 1: If L=1 and N1=4 are given, (# of BD candidate={3, 3,1,1,0}) for AL={1,2,4,8,16} can be decided.

Set 2: If L2=2 and N2=8 are given, (# of BD candidate={0, 3,3,1,1}) for AL={1,2,4,8,16} can decided.

In this case, information as to which one of EPDCCH sets will be used as the reference L of the first step and information as to which one of EPDCCH sets will be corrected in the second step are of little importance. That is, although the first step is performed on the basis of EPDCCH Set 1 and L=1, and correction is performed in the second step on the basis of EPDCCH Set 2 and L2=2 for convenience of description, the scope or spirit of the present invention is not limited thereto.

For example, the above-mentioned operation may also be carried out on the basis of the EPDCCH set transmitted by a serving cell. Assuming that the EPDCCH set transmitted by the serving cell is denoted by Set 1 and L1=2, and the EPDCCH set 2 transmitted from other TPs is denoted by L2=1, the first step is performed at the reference level (L=2) and BD allocation of the EPDCCH set 2 can be coordinated in the second step. Alternatively, the above-mentioned operation may also be performed on the basis of a minimum L from among EPDCCH sets. In this case, the reference level (L2=1) of the EPDCCH set 2 transmitted at TP2 is used as a reference of the first step so as to assume L1=1, and BD allocation of the EPDCCH set 1 can be coordinated in the second step.

Meanwhile, if the BD candidate is allocated to two or more EPDCCH sets, different numbers of BD candidates related to individual sets may be allocated to individual sets. For example, the number of candidates per set may be defined by a function for N and L. For example, N/L is used as a reference of BD splitting so as to reflect the number of available REs. In this case, if different N values are assigned to the same L, different numbers of BD may be assigned to individual sets. If different L values are assigned to the same N, different numbers of BD may be assigned to individual sets. In contrast, although different N and L values are assigned to individual sets, if the same N/L values are given, the same number of BD can be allocated to the individual sets.

Therefore, as one method for considering the N/L values during BD splitting for each set, the number of BD candidates for each set may be proportional to the N/L values of each set. In this case, if the same N/L values are achieved in individual sets, the BD candidate may be evenly distributed to the individual sets.

For example, assuming that N1=4 and L1=1 are assigned for the set 1 and N2=8 and L2=2 are assigned for the set 2, the BD candidate can be allocated as described above.

Set 1: If L1=1 and N1=4 are given, N1/L1=4 and (# of BD candidate={3,3,1,1,0}) for AL={1,2,4,8,16} can be decided.

Set 2: If L2=2 and N2=8 are given, N2/L2=4 and (# of BD candidate={0,3,3,1,1}) for AL={1,2,4,8,16} can decided.

That is, since N1/L1=4 for the set 1 and N2/L2=4 for the set 2 are given, the set 1 and the set 2 may have the same number of BD candidates. {3,3,1,1,0} is assigned to EPDCCH Set 1, and {0,3,3,1,1} is assigned to EPDCCH Set 2 through coordination of BD candidate allocation.

For example, assuming that N1=4 and L1=1 are assigned for the set 1 and N2=8 and L2=1 are assigned for the set 2, the BD candidate can be allocated as described above. In this case, the number of BD candidate for each AL is divided in the ratio of N1/L1 to N2/L2 (i.e., the ratio of 1:2). If the division result is not denoted by other values instead of an integer, this result is processed by a round function.

Set 1: If L1=1 and N1=4 are given, N1/L1=4 and (# of BD candidate={2,2,1,1,0}) for AL={1,2,4,8,16} can be decided.

Set 2: If L2=1 and N2=8 are given, N2/L2=8 and (# of BD candidate={4,4,1,1,0}) for AL={1,2,4,8,16} can decided.

That is, assuming that N1/L1=4 of the set 1 and N2/L2=8 of the set 2 are given, N1/L1:N2/L2=1:2 is given, the number of BD candidates allocated to the set 2 may be double that of the number of BD candidates allocated to the set 1.

If the BD candidate is allocated not only for one case in which N1=4 and L1=1 are provided in consideration of N/L of the first step from among two steps, but also for the other case in which N2=8 and L2=2 are provided in consideration of N/L, the following results can be obtained.

First Step—Assuming that L=L1=L2=1 is assumed for two sets, the BD candidate for the sets is divided on the basis of N/L.

Set 1: L1=1, N1=4, # of BD candidate={2,2,1,1,0} for AL={1,2,4,8,16}

Set 2: L2=1, N2=8, # of BD candidate={4,4,1,1,0} for AL={1,2,4,8,16}

Second Step—Correction of the Set 2

Set 1: L1=1, N1=4, # of BD candidate={2,2,1,1,0} for AL={1,2,4,8,16}

Set 2: L2=2, N2=8, # of BD candidate={0,4,4,1,1} for AL={1,2,4,8,16}

Figure 12:
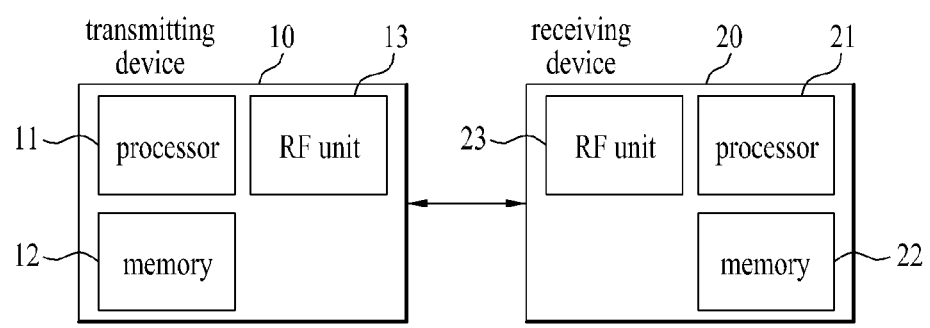
FIG. 12 is a block diagram of an apparatus for implementing embodiment(s) of the present invention.

FIG. 12 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device 10 and/or the receiving device 20 may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used for wireless communication systems such as a UE, a relay, an eNB, etc.

The invention claimed is:

1. A method for receiving a downlink control signal by a user equipment (UE) in a wireless communication system, the method comprising:
monitoring a plurality of enhanced physical downlink control channel (EPDCCH) candidates in an EPDCCH set to decode an EPDCCH transmitted from a downlink serving base station (BS); and
receiving a physical downlink shared channel (PDSCH) corresponding to the decoded EPDCCH,
wherein the EPDCCH candidates have a minimum aggregation level of 2 if both a downlink (DL) bandwidth includes at least 25 resource blocks (RBs) and a downlink control information (DCI) format is one of DCI formats 2, 2A, 2B, 2C and 2D.

2. The method according to claim 1, wherein, if a number of PRB pairs constituting the EPDCCH set is 4, a number of the EPDCCH candidates are set to 8, 4, 2, and 1 at aggregation levels 2, 4, 8, and 16, respectively.

3. The method according to claim 1, further comprising:
receiving information regarding the number of EPDCCH candidates for each aggregation level (L) from the downlink serving BS.

4. The method according to claim 1, further comprising:
if an aggregation level (L1) is set to be higher than a number of enhanced control channel elements (ECCEs) contained in the EPDCCH set, allocating EPDCCH candidates for the L1 to other aggregation levels.

5. The method according to claim 4, wherein the EPDCCH candidates for the L1 are attempted to be allocated to the other aggregation levels with priority from a highest aggregation level to a lowest aggregation level from among aggregation levels less than the L1, from among aggregation levels set in the EPDCCH set.

6. The method according to claim 5, wherein, if an additional EPDCCH candidate cannot be allocated to a specific aggregation level from among aggregation levels less than the L1, the additional EPDCCH candidate is allocated to a next highest aggregation level subsequent to the specific aggregation level.

7. The method according to claim 1, wherein, a number of EPDCCH candidates of the EPDCCH set is decided according to each aggregation level (L), a number (N) of physical resource block (PRB) pairs of the EPDCCH set, and a number of enhanced control channel elements (ECCEs) per PRB pair, and
wherein a number of EPDCCH candidates for each N is fixed.

8. The method according to claim 1, wherein, if two EPDCCH sets are present, the two EPDCCH sets are set to have different minimum aggregation levels.

9. The method according to claim 1, wherein, if two EPDCCH sets are present, the two EPDCCH sets are set in a manner that individual aggregation levels have different numbers of EPDCCH candidates.

10. The method according to claim 9, wherein, if an aggregation level (L2) higher than a number of enhanced control channel elements (ECCEs) contained in a first EPDCCH set is set in the first EPDCCH set, EPDCCH candidates for the L2 are allocated to a second EPDCCH set.

11. The method according to claim 10, wherein the EPDCCH candidates for the L2 are attempted to be allocated to the second EPDCCH set with priority from a highest aggregation level to a lowest aggregation level from among aggregation levels less than the L2, from among aggregation levels set in the first EPDCCH set.

12. The method according to claim 11, wherein, if an additional EPDCCH candidate cannot be allocated to a specific aggregation level from among aggregation levels less than the L2, the additional EPDCCH candidate is allocated to a next highest aggregation level subsequent to the specific aggregation level.

13. A user equipment (UE) configured to receive a downlink control signal in a wireless communication system, the UE comprising:
a radio frequency (RF) unit; and
a processor configured to control the RF unit, the processor further configured to:
monitor a plurality of enhanced physical downlink control channel (EPDCCH) candidates in an EPDCCH set to decode the EPDCCH, and
receive a physical downlink shared channel (PDSCH) corresponding to the decoded EPDCCH,
wherein the EPDCCH candidates have a minimum aggregation level of 2 if both a downlink (DL) bandwidth and includes at least 25 resource blocks (RBs) and a downlink control information (DCI) format is one of DCI formats 2, 2A, 2B, 2C and 2D.

14. The method according to claim 1, wherein, if an additional EPDCCH candidate cannot be allocated to a specific aggregation level from among aggregation levels less than a threshold aggregation level, the additional EPDCCH candidate is allocated to a next highest aggregation level subsequent to the specific aggregation level.

15. The method according to claim 14, wherein the allocating of the additional EPDCCH candidate to the next highest aggregation level subsequent to the specific aggregation level is limited by a total number of enhanced control channel elements (ECCEs), and wherein the total number of the ECCEs that may be generated is 32.

* * * * *